United States Patent [19]

Brock, Jr.

[11] 4,204,512
[45] May 27, 1980

[54] CYLINDER DEACTIVATOR SYSTEM

[76] Inventor: Horace T. Brock, Jr., Box 238, Ehrenberg, Ariz. 85334

[21] Appl. No.: 890,692

[22] Filed: Mar. 27, 1978

[51] Int. Cl.$^2$ .............................................. F02D 13/06
[52] U.S. Cl. .............................. 123/198 F; 123/90.16; 123/90.39
[58] Field of Search ............. 123/198 F, 90.32, 90.61, 123/90.62, 90.39, 90.47, 90.16

[56] References Cited

U.S. PATENT DOCUMENTS

| | | | |
|---|---|---|---|
| 3,964,455 | 6/1976 | Brown | 123/90.16 |
| 4,050,435 | 9/1977 | Fuller, Jr. et al. | 123/198 F |
| 4,064,861 | 12/1977 | Schulz | 123/198 F |
| 4,114,588 | 9/1978 | Jordan | 123/198 F |

Primary Examiner—Ira S. Lazarus
Attorney, Agent, or Firm—Charles C. Logan, II

[57] ABSTRACT

A cylinder deactivator system for an internal combustion engine having an engine block and head, a plurality of engine cylinders in the block, intake and exhaust valves for each engine cylinder spring-loaded to their closed positions, and a cam operated valve train operating each of the valves. Each valve train has a rocker lever assembly and a rocker lever shaft. The rocker lever assembly has a bore passing substantially horizontally through its midsection that allows the rocker lever assembly to be rockingly connected to the rocker lever shaft passing therethrough. One end of the rocker lever assembly presses against a coil spring assembly that normally keeps the valve closed and the other end of the rocker lever assembly receives the top of a push rod. The rocker lever assembly has a first member and a second member that are joined at the midsection of the rocker lever assembly with each member having aligned horizontal bores at their ends adjacent at the midsection through which passes the rocker lever shaft. A first fluid pressure cylinder assembly is mounted on the top of the first member of the rocker lever assembly and it has a piton, a piston rod, and a pawl mounted on the end of the piston rod. Two of the opposite surfaces of the pawl mate with the shoulder surfaces of the first and second member in the manner of a keystone when that particular cylinder is operational. When the pawl is in position the rocker lever operates in the manner of an unmodified rocker lever.

9 Claims, 10 Drawing Figures

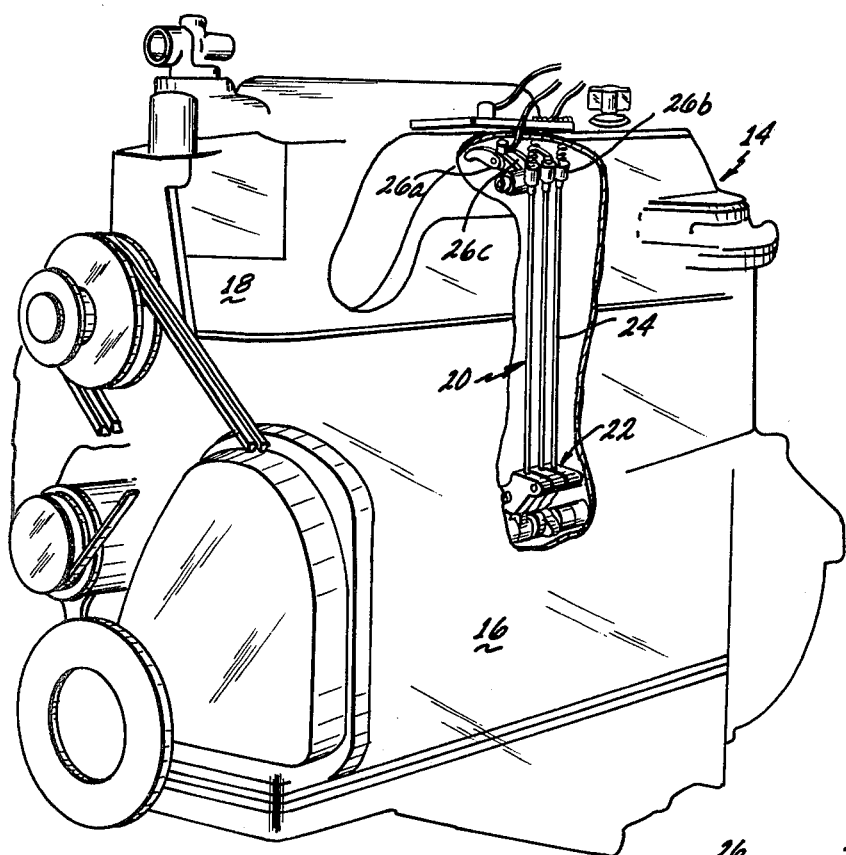
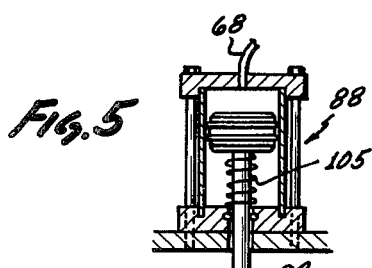
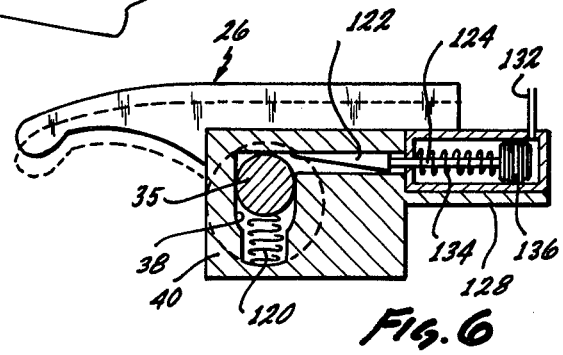
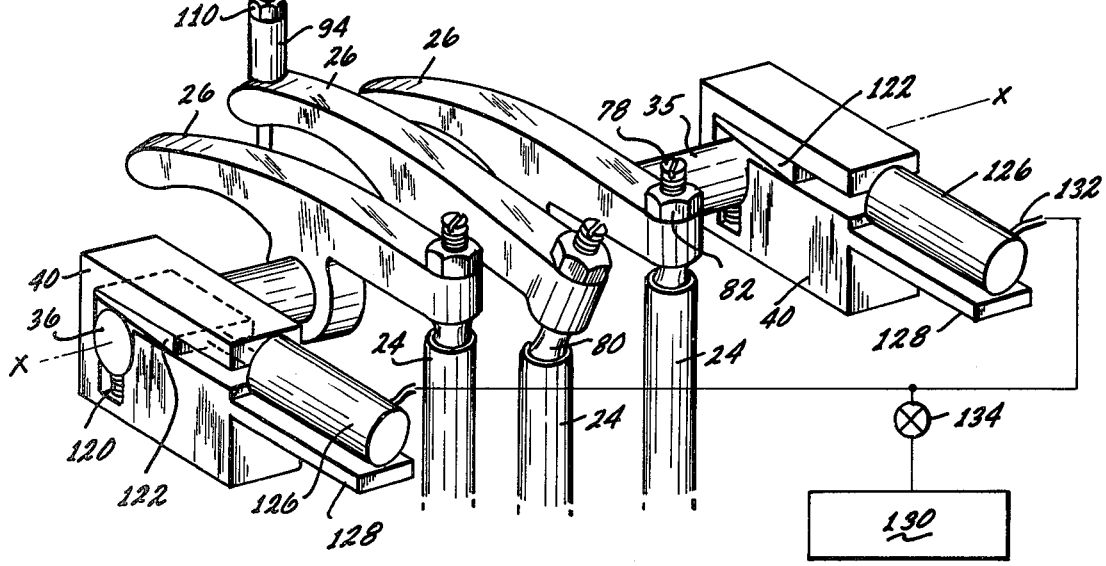

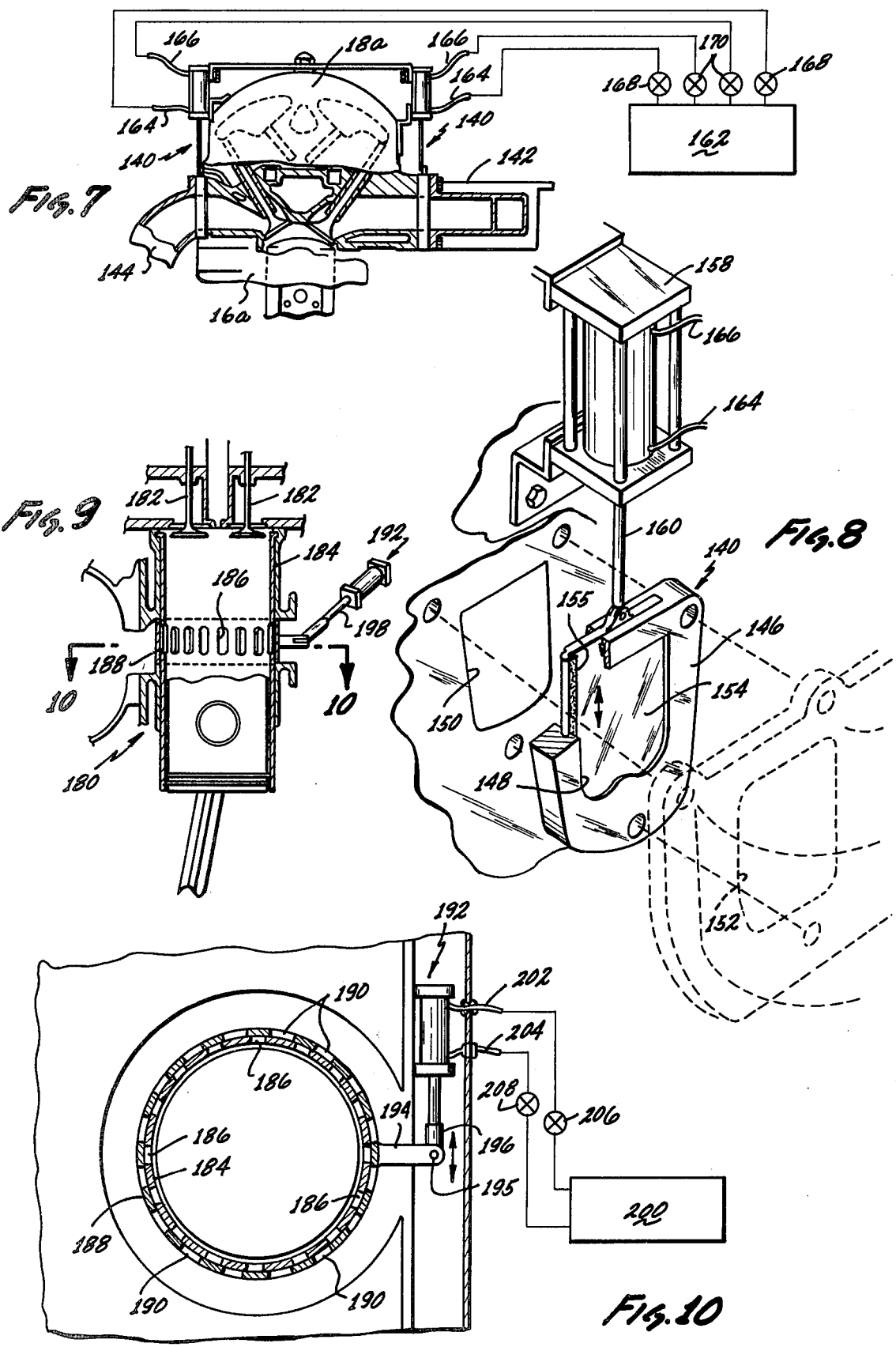

CYLINDER DEACTIVATOR SYSTEM

BACKGROUND OF THE INVENTION

The invention relates to a multi-cylinder internal combustion engine and in particular, to means for making a selected number of the cylinders of the engine inoperative thereby to cause the engine to operate on less than all of its cylinders, and thusly change the operating characteristics and fuel consumption of the engine so that it will operate at a fraction of its power output and at a corresponding reduction in fuel consumption whenever full power is not required.

In the past, several inventions have been developed for inactivating a selected number of cylinders of an engine during different stages of its operation in order to reduce fuel consumption. One such device is illustrated in U.S. Pat. No. 2,197,529, wherein the inventor utilizes two inlet manifolds. Certain of the cylinders are connected to one manifold and the others to the other manifold. By arresting the flow of fuel into one of the manifolds, while delivery is continued to the other manifold, half of the cylinders of the engine are deactivated, thus resulting in a conservation of fuel; for instance, in an automobile that stops at frequent intervals while permitting the engine to run idly while the driver attends to some errands.

Another device for inactivating predetermined cylinders of an internal combustion engine is illustrated in U.S. Pat. No. 2,528,983. In this system, each of the intake and exhaust valves have a plurality of cams with which each may be brought into contact. Depending on which of these cams the bottom of the valve comes into contact with, determines whether the valve will open or not. These cams are moved by shifting the camshaft laterally to change the operation of the exhaust and intake valves.

A third system for deactivating predetermined cylinders of an internal combustion engine is illustrated in U.S. Pat. No. 2,948,274. In this device, the desired results are effected by locking the valve lifter mechanism of the exhaust valve of each said selected cylinder out of operation after the exhaust valve has been opened. Normal operation is resumed by releasing the locked valve lifters.

Numerous other attempts have been made to devise cylinder deactivator systems for internal combustion engines but most have not been successfully received by the public.

It is an object of the invention to provide a cylinder deactivator system that may be retrofitted to internal combustion engines presently in operation on the highways.

It is also an object of the invention to provide a novel cylinder deactivator system that may be retrofitted to both two and four cycle diesel engines presently in operation on the highways.

It is also an object of the invention to provide a novel cylinder deactivator system that may be installed on a typical internal combustion engine by changing as few parts as possible.

It is a further object of the invention to provide a novel cylinder deactivator system that can deactivate any number of cylinders on a given engine by simply stopping the air/fuel flow and exhaust gas flow in that cylinder.

It is an additional object of the invention to provide a novel cylinder deactivator system which allows for the normal up and down reciprocal motion of the push rod or alternatively to capture the push rods in their raised position to completely deactivate the whole valve train from the cam shaft.

SUMMARY OF THE INVENTION

The cylinder deactivator system is to be utilized with an internal combustion engine having an engine block and head, a plurality of engine cylinders in the block, intake and exhaust valves for each cylinder spring loaded to their closed positions, and a cam operated valve train operating each of the valves. The valve train in one embodiment utilizes a rocker lever assembly with a rocker lever shaft.

The rocker lever assembly has a bore passing substantially horizontally through its midsection that allows the rocker lever assembly to be rockingly connected to the rocker lever shaft passing therethrough. One end of the rocker lever assembly presses against the coiled spring assembly that normally keeps the valve closed and the other end of the rocker lever assembly receives the top of a push rod. The rocker lever assembly has a first member and a second member that are joined at the midsection of the rocker assembly with each member having aligned horizontal bores at their ends adjacent the midsection through which passes the rocker lever shaft. The first member has a shoulder surface normally spaced from but facing a shoulder surface on the second member whereby when a push rod lifts the second member upwardly about the rocker lever shaft, the shoulder surface on the second member approaches the shoulder surface on the first member.

In operation the rocker lever assembly is deactivated by the fluid pressure cylinder assembly mounted on the top of the first member of the rocker lever assembly. The fluid pressure cylinder assembly has a piston, a piston rod, and a pawl mounted on the end of the piston rod. Two of the opposite surfaces of the pawl mate with the shoulder surfaces of the first and second member in the manner of a keystone. Connected to the fluid pressure cylinder assembly is a reservoir having a valve in the line connecting the two. When the valve is opened, a flow of fluid under pressure lifts the pawl out of position between the shoulder surfaces of the first and second member. When this occurs the push rod continues to travel up and down and in the process rocks the second member about the rocker lever shaft. The first member however does not rock about the rocker lever shaft and thus the valve remains in its closed position. A spring assembly is attached to the top of the second member to keep the push rod bias downwardly against a cam on the cam shaft and also to aid during the act of inserting the pawl back into position between the first and second member when reactivating the cylinder. The structure utilized to inactivate the exhaust valve and air intake valve are the same.

When the engine is a diesel engine, each cylinder has an additional rocker lever mounted between the air intake rocker lever and the exhaust rocker lever. This additional rocker lever is for controlling the flow of fuel through an injector into that cylinder. The additional rocker lever is rockingly connected to the rocker lever shaft at its midsection with one of its ends being connected to a push rod and its other end being connected to an injector. A fluid pressure cylinder assembly is fixedly mounted to the engine block above the injector for stopping the flow of fuel through the injector when the valves of that cylinder have been closed by the deactivator system. The fluid pressure cylinder assembly has a piston, a piston rod, and a ring retainer attached to the end of the piston rod. A fluid reservoir is connected to the fluid pressure cylinder assembly and it has a valve located in the line between them. When the valve is opened, fluid pressure from the reservoir drives the spring retainer downwardly to hold the injector closed when the valves of the cylinder have been deactivated. A leaf spring extends laterally through the spring retainer with its opposite ends pressing downward on the free ends of the first members of the adjacent rocker lever assemblies to aid during the act of inserting the pawl back into position between the first and second members when reactivating the cylinders.

An alternative embodiment of the novel cylinder deactivator system can also be utilized on an internal combustion engine having the rocker levers rockingly mounted on a rocker lever shaft. This embodiment is designed to inactivate the valves of the cylinder by changing the fulcrum of the system. In normal operation of the engine the fulcrum about which the rocker levers rotate is the axis of the rocker lever shaft. The modifications made include forming a plurality of bosses on the rocker lever shaft and supporting these bosses in vertical guide channels in the engine block. Spring members are mounted beneath the bosses in the guide channels to bias the rocker lever shaft upwardly and wedge members are movable into and out of position to limit the upward travel of the rocker lever shaft. The wedges are attached to the end of a piston rod extending from a fluid pressure cylinder. The cylinders are connected to a fluid pressure reservoir and have a valve in the line there between. When the valve is opened fluid under pressure drives the wedge into the position where it blocks the upward travel of the rocker lever shaft. When a second valve in the system is opened the piston in the fluid pressure cylinder is driven in an opposite direction thus removing the wedge from its blocking position. When this happens the fulcrum about which the rocker levers pivot shifts from the axis of the rocker lever shaft to an axis passing through the ends of a rocker arm where they contact the top of the valve assemblies. When this happens the upward travel of the push rods does not transfer sufficient downward force on the valves of the cylinders to open them.

The novel cylinder deactivator system of the second embodiment can also be used with a diesel engine that has a rocker lever shaft with rocker levers rockingly mounted thereon. In the diesel engine a fluid pressure cylinder assembly would need to be fixedly mounted to the engine block above the injector in the same manner as was described with respect to the first embodiment.

A second alternative embodiment used to deactivate selected cylinders of an internal combustion engine uses sliding door valves in the air intake passages and exhaust passages for cutting off the flow of fluids therethrough. In the preferred embodiment of this system a separate valve housing would be positioned between the cylinder and each of the intake and exhaust manifolds. The valve housing would have a fluid passage open from one side of the housing to the other side that would be closed by a sliding door valve that would close the fluid passage. A fluid pressure cylinder assembly would be mounted adjacent the valve housing with the piston rod of the assembly connected to the door valve. The fluid pressure cylinder assembly would be connected to a fluid pressure reservoir having the normal valves and circuits. Responsive to opening one of the valves, the sliding door would be raised out of the aperture and responsive to operation of another of the valves the door valve would be closed. In this embodiment the valve trains of the different cylinders would not be modified.

A fourth alternative novel cylinder deactivator system embodiment would function with a two cycle engine wherein there are only exhaust valves positioned adjacent to the top of the cylinder. There would be air intake ports along the side walls of the engine cylinders. The modification to be made to this standard engine cylinder configuration is to add a cylindrical collar having mating air intake ports located around the periphery of its side walls and to mount this along the outside walls of the cylinder adjacent the ports in the cylinder itself. A fluid pressure assembly would have its free end of the piston rod connected to the collar member. The fluid pressure assembly would be connected to an air pressure reservoir having the normal valves in the connecting line. By opening one of the appropriate valves, the piston rod would be driven in one direction thus causing the collar to rotate until all the air intake port of the cylinder have been covered. By opening a second appropriate valve the piston rod would be driven in an opposite direction thereby causing the collar to rotate and uncover all of the air intake ports of the cylinder. The exhaust valves at the top of the cylinder could be inactivated by either the methods described in the first or second embodiment if the engine utilizes a rocker lever shaft type configuration. If a different type of structure is utilized to activate the exhaust valves one of the embodiments described in U.S. patent application Ser. No. 848,937 might be utilized.

DESCRIPTION OF THE DRAWINGS

FIG. 1 is a perspective view of the type of internal combustion engine being modified with selected areas being broken away for clarity;

FIG. 5 is a perspective view of a first alternative embodiment;

FIG. 6 is an end section view of the system illustrated in FIG. 5;

FIG. 7 is an end section view of a second alternative embodiment;

FIG. 8 is an exploded perspective of the second alternative embodiment;

FIG. 9 is a sectional view of a third alternative embodiment; and

FIG. 10 is a sectional view taken along lines 10—10 of FIG. 9.

DESCRIPTION OF THE PREFERRED EMBODIMENT

Figure 2:
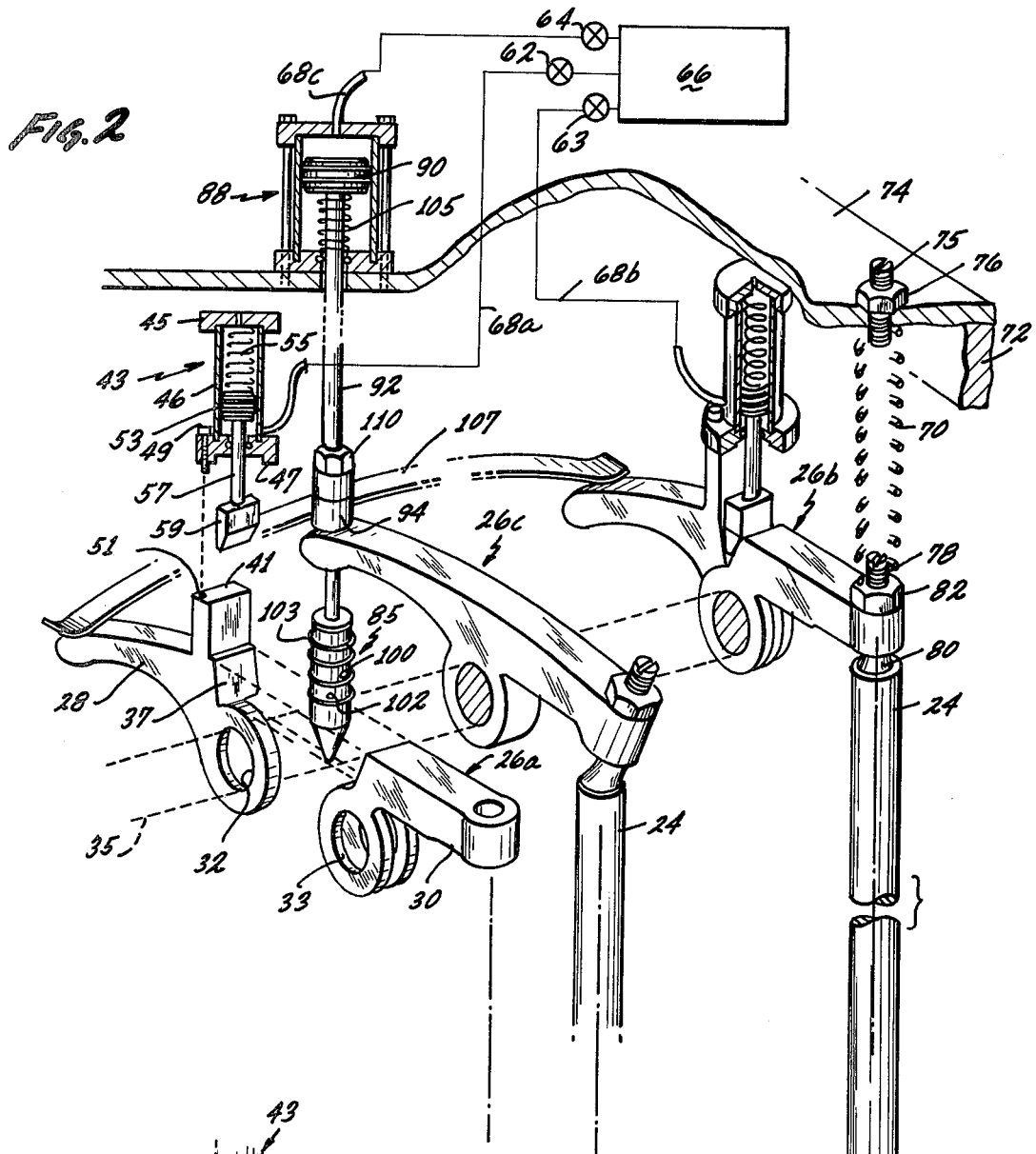
FIG. 2 is an exploded perspective view of the valve train of the engine illustrated in FIG. 1.

The operation of the cylinder deactivator system for an internal combustion engine can best be described by referring to the drawings. In FIG. 1, a typical engine of the type to which applicant's system can be applied is illustrated. The engine is generally designated 14. It has a block 16 and a head 18. In the conventional cylinders are pistons on connecting rods coupled to a crank shaft. The intake valves and exhaust valves are operated through valve trains 20. These valve trains 20 comprise cam follower assemblies 22, push rods 24, and rocker lever assemblies 26.

Figures 3, 4:
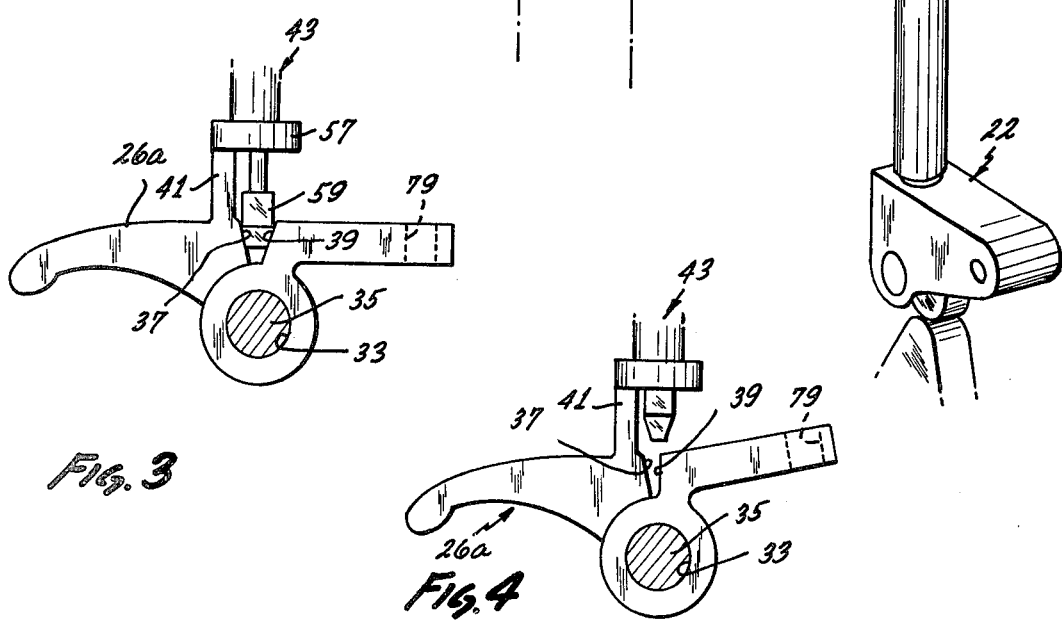
FIG. 3 is a side elevation view of the novel rocker lever assembly.
FIG. 4 is a side elevation view of the rocker lever assembly illustrating the valve train in an inactivated state.

The rocker lever assembly 26 is best illustrated in FIGS. 2 through 4. Numeral 26a denotes the intake rocker lever assembly and numeral 26b denotes the exhaust rocker lever assembly. These two assemblies are identical. The injector rocker lever assembly is identified by numeral 26c and its structure is that of a standard rocker lever.

Since rocker lever assembly 26a and 26b are identical, only the structure of rocker lever assembly 26 will be described. It comprises a first member 28 and a second member 30 that are joined at the midsection of the rocker lever assembly with each member having aligned horizontal bores 32 and 33 respectively. The rocker lever shaft 35 passes through the aligned horizontal bores 32 and 33. The first member has a shoulder surface 37 spaced from but facing a shoulder surface 39 which approaches the shoulder surface 37 on the first member when the cylinder is deactivated. A mounting member 41 is formed on the first member 28 for attaching a fluid pressure cylinder assembly 43 thereto.

The fluid pressure cylinder assembly 43 has a cap 45, a tubular housing 46 and a base 47. The fluid pressure cylinder assembly 43 is attached to the mounting member 41 by a bolt 49 that screws into threaded bore 51. The fluid pressure cylinder assembly has a piston 53 that is normally biased downwardly by a spring 55. A piston rod extends downwardly from the piston 53 and has a pawl 59 attached to its bottom end. During the period when the cylinder is operational, pawl 59 is positioned between shoulder surfaces 37 and 39 in the manner illustrated in FIG. 3. While in this position the normal upward travel of the piston rod 24 will cause the rocker lever assembly 26a to rock about rocker lever shaft 35 in such a manner that the air intake valve of the cylinder will be caused to open and close in its normal manner.

When it is desired to deactivate this cylinder valves 62 and 63 are opened causing pressurized fluid from reservoir 66 to pass through tubing 68 to drive the pistons 53 in the fluid pressure cylinder assemblies 43 upwardly causing the pawl members 59 to be withdrawn from between shoulder surfaces 37 and 39. Upward travel of the push rods 24 cause the second member 30 to be rotated upwardly to its upper most position which is illustrated in FIG. 4. It can thus be seen that the upward travel of the push rod 24 can no longer result in the first member 28 opening its associated valve member.

In order to activate the cylinder again, valves 62 and 63 would be closed. These valves have a relief outlet that allows the air that had been forced into the fluid pressure cylinder assembly to be released. As this occurs the springs 55 drive the pawls 59 downwardly into the position illustrated in FIG. 3. At this point the valve train 20 of the cylinder is fully operational again.

In order to aid in the reinsertion of the pawl member 59 down into the rocker lever assembly 26, an additional modification is made to the structure. A spring member 70 is utilized to maintain a downwardly biasing force on the top of push rod 24. In order to insert this spring 70 into position it is necessary to insert a spacer 72 beneath plate 74. The top of the spring is held in position by a bolt 75 extending downwardly through plate 74 and being locked in position by a nut 76. The bottom end of spring 70 is captured by bolt 78 which passes through bore 79 in the second member 30. The head 80 of bolt 78 is captured within the top of push rod 24. Locking nut 82 allows for adjustability of the bolt 78 upwardly or downwardly.

When the cylinder deactivator system is utilized on a gasoline engine, there is only a need for the two rocker lever assemblies 26a and 26b. When the cylinder deactivator system is utilized with a diesel engine such as illustrated in FIGS. 1 and 2, it is necessary that additional structure be added to prevent the operation of the fuel injector 85. The structure for accomplishing this is illustrated in FIG. 2 and takes the form of a fluid pressure cylinder assembly 88 that is mounted on top of plate 74. The fluid pressure cylinder assembly has a piston 90, a piston rod 92, and a spring retainer 94 mounted on the bottom end of the piston rod 92. The bottom of the spring retainer 94 rests on the top of rocker lever 26c. When valve 64 is open, fluid under pressure is released through tubing 68c causing piston 90 to be driven downwardly which in turn forces injector 85 downwardly. In this downward position the flow of fuel through the internal passages formed in the head of the engine is prevented from entering inlet 100 and also returning through outlet 102 of the injector. O-rings 103 form sealing walls between the respective passages that connect with inlet 100 and outlet 102. The fuel that normally would pass through the injector 85 has a normal path of travel downward through injector 85 into the top of the cylinder. When it is desired to activate the cylinder again, valve 64 would be closed thus causing the fluid under pressure in tubing 68c to be dumped thereby letting spring 105 drive the piston 90 upwardly making injector 85 operational again. Extending laterally from spring retainer 94 is a leaf spring 107 having its opposite ends pressing downwardly on the free ends of first members 28. This leaf spring performs the function of aiding in the operation of keeping the first and second members biased in opposite directions during the operation of reinserting the pawl 59 between shoulder surfaces 37 and 39 of the rocker lever assembly. Spring retainer 94 is screwed onto the threaded end of piston rod 92 and its horizontal position can be varied and locked into place by jam nut 110.

The type of fluid contained in fluid reservoir 66 may be either air or hydraulic. When using valves that dump the fluid on closing of the valve, the system would be utilizing air pressure. If hydraulic fluid were utilized a different type of valve and a different type of circuit would be utilized. Additionally the system can be designed to actuate the valves 62, 63, and 64 simultaneously or sequentially. A further modification could utilize a single valve to operate all three fluid circuits 68a, 68b and 68c.

The first alternative embodiment of the novel cylinder deactivator system is illustrated in FIGS. 5 and 6. This embodiment is designed to inactivate the valves of the cylinder by changing the fulcrum of the system. In normal operation of the engine the fulcrum about which the rocker levers rotate is the axis X of the rocker lever shaft 35. The modifications made include forming a plurality of bosses 36 on the rocker lever shaft and supporting these bosses in vertical guide channels 38 in mounting support blocks 40. Spring members 120 are mounted beneath the bosses in the guide channels to bias the rocker lever shaft upwardly and wedge members 122 are movable into and out of position to limit the upward travel of the rocker lever shaft 35. The wedges 122 are attached to the end of a piston rod 124 extending from a fluid pressure cylinder assembly 126. The fluid pressure cylinder assembly 126 are mounted on support arms 128 formed on mounting support blocks 40. A fluid pressure reservoir 130 is connected to the fluid pressure cylinder assemblies by tubing 132 having a valve 134 in the line. When valve 134 is opened fluid under pressure drives the wedge into the position where it blocks the upward travel of the rocker lever shaft. When valve 134 is closed the fluid that had been driven into the fluid pressure cylinder assembly 126 is bled to atmosphere and springs 134 drive the pistons 136 rearwardly causing the withdrawal of wedges 122. When this happens the fulcrum about which the rocker levers pivot shifts from the axis of the rocker lever shaft to an axis passing through the ends of the rocker arms where they contact the top of the valve assemblies. Thus the upward travel of the push rods does not transfer sufficient downward force on the valves of the cylinder to open them.

When this first alternative embodiment of the novel cylinder deactivator system is used with a diesel engine that has a rocker lever shaft with rocker levers rockingly mounted thereon, a fluid pressure cylinder assembly 88 would need to be fixedly mounted to the engine block above the injector in the same manner as was described with respect to the first embodiment.

A second alternative embodiment is illustrated in FIGS. 7 and 8. The engine block is designated numeral 16a and the engine head is designated numeral 18a. The structure utilized to deactivate selected cylinders of the internal combustion engine comprises sliding door valve assemblies 140 positioned between the engine head and the respective air intake manifold 142 and exhaust 144.

Each sliding door valve assembly 140 has a valve housing 146 with a fluid passage 148 open from one side of the housing to the other side. The fluid passage 148 is aligned with port holes 150 in the engine head and port holes 152 in the respective manifolds. A sliding door valve 154 functions to close the fluid passage. This sliding door valve 154 also has a wiper seal structure 155 around its periphery to ensure a good seal between the sliding door valve and the valve housing. Fluid pressure cylinder assemblies 158 are mounted adjacent the sliding door valve assemblies with the piston rod 160 of the assembly connected to the door valve. The fluid pressure cylinder assembly 158 is connected to a fluid pressure reservoir 162 by tubing 164 and 166. Responsive to the opening of valves 168, the sliding door valve 154 would be raised out of the aperture and responsive to operation of valves 170, the sliding door valve would be closed. In this embodiment the valve trains of the different cylinders need not be modified.

The fourth alternative of the novel cylinder deactivator system embodiment is illustrated in FIGS. 9 and 10 which shows a two-cycle engine 180 having only exhaust valves 182 positioned adjacent to the top of the cylinder 184. There are air intake ports 186 along the side walls of the engine cylinders. The modification to this standard engine cylinder configuration is the addition of a cylindrical collar 188 having mating air intake ports 190 located around the periphery of the side walls. This cylindrical collar is mounted along the outside walls of the cylinder adjacent the ports 186 of the cylinder itself. The collar 188 has an arm 194 extending radially outwardly therefrom that is pivotally attached by pin 195 to an arm 196 attached to the piston rod 198 of the fluid pressure cylinder assembly 192. The fluid pressure cylinder assembly would be connected fluid pressure reservoir 200 by tubes 202 and 204. By opening valve 206, the piston rod 198 would be driven outwardly causing the collar 188 to rotate until all the air intake ports 186 of the cylinder have been covered. By opening valve 208 the piston rod would be withdrawn thereby causing the collar to rotate and uncover all of the air intake ports of the cylinder.

What is claimed is:

1. A cylinder deactivator system for an internal combustion engine comprising:
   an engine block and head,
   a plurality of engine cylinders in said block;
   intake and exhaust valves for each engine cylinder spring loaded to their closed positions,
   a cam operated valve train operating each said valve, said valve train comprising a rocker lever assembly and a rocker lever shaft, said rocker lever assembly having a bore passing substantially horizontally through its midsection that allows the rocker lever assembly to be rockingly connected to said rocker lever shaft passing therethrough, one end of said rocker lever assembly receiving the top of a push rod,
   said rocker lever assembly comprising a first member and a second member that are joined at the midsection of the rocker lever assembly with each member having aligned horizontal bores at their ends adjacent the midsection through which passes said rocker lever shaft,
   a fluid pressure means for deactivating the rocker lever assembly normal downward operational force exerted against the coiled spring assembly that functions to keep the valve closed.

2. A cylinder deactivator system for an internal combustion engine as recited in claim 1 wherein said first member has a shoulder surface normally spaced from but facing a shoulder surface on said second member approaches the shoulder surface on the first member.

3. A cylinder deactivator system for an internal combustion engine as recited in claim 2 wherein said fluid pressure means for deactivating the rocker lever assembly comprises a first fluid pressure cylinder assembly mounted to the top of said first or second member of the rocker lever assembly.

4. A cylinder deactivator system for an internal combustion engine as recited in claim 3 wherein said first fluid pressure cylinder assembly comprises a piston, a piston rod, and a pawl mounted on the end of said piston rod, two of whose opposite surfaces mate with the shoulder surfaces of said first and second member in the manner of a keystone.

5. A cylinder deactivator system for an internal combustion engine as recited in claim 4 further comprising spring means attached to said second member for keeping said push rod biased downwardly against a cam on a camshaft and also to aid during the act of inserting the pawl back into position between said first and second member when reactivating the cylinder.

6. A cylinder deactivator system for an internal combustion engine as recited in claim 5 wherein said engine is a diesel engine having a rocker lever for each cylinder for controlling the flow of fuel through an injector into that cylinder, said rocker lever being rockingly connected to said rocker lever shaft at its midsection with one of its ends being connected to a push rod and its other end being connected to an injector.

7. A cylinder deactivator system for an internal combustion engine as recited in claim 6 further comprising a second fluid pressure cylinder assembly, said second fluid pressure means fixedly mounted to the engine block above said injector for stopping the flow of fuel through the injector when the valves of that cylinder have been closed by the deactivation system.

8. A cylinder deactivating system for an internal combustion engine as recited in claim 7 wherein said second fluid pressure cylinder assembly comprises a piston, a piston rod and a spring retainer attached to the end of said piston rod, said spring retainer functioning to hold said injector closed when the cylinder has been deactivated.

9. A cylinder deactivating system for an internal combustion engine as recited in claim 8 wherein said second fluid pressure cylinder assembly further comprises second spring means for holding the free end of said first member of said rocker lever assembly down to aid during the act of inserting the pawl back onto position between said first and second member when reactivating the cylinder.

* * * * *